US012627204B2

(12) United States Patent (10) Patent No.: US 12,627,204 B2
Kato et al. (45) Date of Patent: May 12, 2026

(54) LAMINATED IRON CORE AND LAMINATED IRON CORE MANUFACTURING METHOD

(71) Applicant: MITSUI HIGH-TEC, INC., Fukuoka (JP)

(72) Inventors: Go Kato, Fukuoka (JP); Yasutaka Ohba, Fukuoka (JP); Yuki Tokimoto, Fukuoka (JP); Tetsuya Hirakawa, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 151 days.

(21) Appl. No.: 18/602,244

(22) Filed: Mar. 12, 2024

(65) Prior Publication Data

US 2024/0313624 A1 Sep. 19, 2024

(30) Foreign Application Priority Data

Mar. 15, 2023 (JP) ................................. 2023-040206

(51) Int. Cl.
*H02K 15/03* (2025.01)
*H02K 1/276* (2022.01)
*H02K 15/12* (2025.01)
(52) U.S. Cl.
CPC ............. *H02K 15/03* (2013.01); *H02K 1/276* (2013.01); *H02K 15/12* (2013.01)

(58) Field of Classification Search
CPC ......... H02K 15/03; H02K 1/276; H02K 15/12
USPC ...................................................... 310/156.01
See application file for complete search history.

(56) References Cited

U.S. PATENT DOCUMENTS

2012/0206007 A1* 8/2012 Kitagawa ............... H02K 15/03
29/598
2020/0007012 A1* 1/2020 Ikemoto ............. B23K 26/0869

FOREIGN PATENT DOCUMENTS

| JP | H09149605 A | * | 6/1997 |
| JP | 2000209792 A | * | 7/2000 |
| JP | 5278551 | | 9/2013 |
| WO | WO-2011114414 A1 | * | 9/2011 ............... H02K 1/28 |

* cited by examiner

*Primary Examiner* — Jose A Gonzalez Quinones
(74) *Attorney, Agent, or Firm* — Sterne, Kessler, Goldstein & Fox P.L.L.C.

(57) ABSTRACT

A laminated iron core includes a laminated body including a plurality of laminated metal sheets. The laminated body includes a welded portion where an endmost metal sheet located at an endmost position in a lamination direction and the metal sheet in contact with the endmost metal sheet are welded. A welding end of the welded portion is in contact with at least one endmost metal sheet.

10 Claims, 8 Drawing Sheets

LAMINATED IRON CORE AND LAMINATED IRON CORE MANUFACTURING METHOD

CROSS-REFERENCE TO RELATED APPLICATIONS

This application is based on and claims priority under 35 USC 119 from Japanese Patent Application No. 2023-040206 filed on Mar. 15, 2023, the contents of which are incorporated herein by reference.

TECHNICAL FIELD

An embodiment disclosed herein relates to a laminated iron core and a laminated iron core manufacturing method.

BACKGROUND ART

A laminated iron core constituting a stator or a rotor of a motor is manufactured by, for example, feeding a strip-shaped metal sheet to a die device sequentially, performing punching sequentially at processing stations located side by side along a feeding direction of the metal sheet to form iron core pieces of a desired shape, and laminating the obtained iron core pieces.

In the laminated iron core, in order to prevent separation of an iron core piece located at an endmost position in a lamination direction (hereinafter also referred to as an endmost iron core piece), a technique of welding the endmost iron core piece and an iron core piece adjacent to the endmost iron core piece is used.

CITATION LIST

Patent Literature

Patent Literature 1: JP5278551B

On the other hand, in a welding process, cracks may occur in a welded portion due to residual stress in a tensile direction generated when the welded portion contracts during cooling. As a result, welding quality of the laminated iron core may deteriorate.

SUMMARY

An aspect of the embodiment has been made in view of the above, and an object thereof is to provide a laminated iron core and a laminated iron core manufacturing method that can improve the welding quality.

A laminated iron core according to an aspect of an embodiment includes a laminated body including a plurality of laminated metal sheets. The laminated body includes a welded portion where an endmost metal sheet located at an endmost position in a lamination direction and the metal sheet in contact with the endmost metal sheet are welded. A welding end of the welded portion is in contact with at least one endmost metal sheet.

A laminated iron core manufacturing method according to an aspect of the embodiment includes a laminated body forming process and a welding process. In the laminated body forming process, a plurality of metal sheets are laminated to form a laminated body. In the welding process, an endmost metal sheet located at an endmost position in a lamination direction of the laminated body and the metal sheet in contact with the endmost metal sheet are welded. In the welding process, a position in contact with at least one endmost metal sheet is welded last.

According to an aspect of the embodiment, the welding quality of the laminated iron core can be improved. The effects described herein are not necessarily limited, and may be any of the effects described in the present disclosure.

DESCRIPTION OF EMBODIMENTS

Hereinafter, a laminated iron core and a laminated iron core manufacturing method disclosed in the present application will be described with reference to the accompanying drawings. It should be noted that the present disclosure is not limited by the embodiments shown below.

It should be noted that the drawings are schematic, and a dimensional relationship of elements, ratios of the elements, and the like may differ from reality. Further, even between the drawings, there are cases where portions having different dimensional relationships and ratios are included.

Laminated Iron Core

Figure 1A:
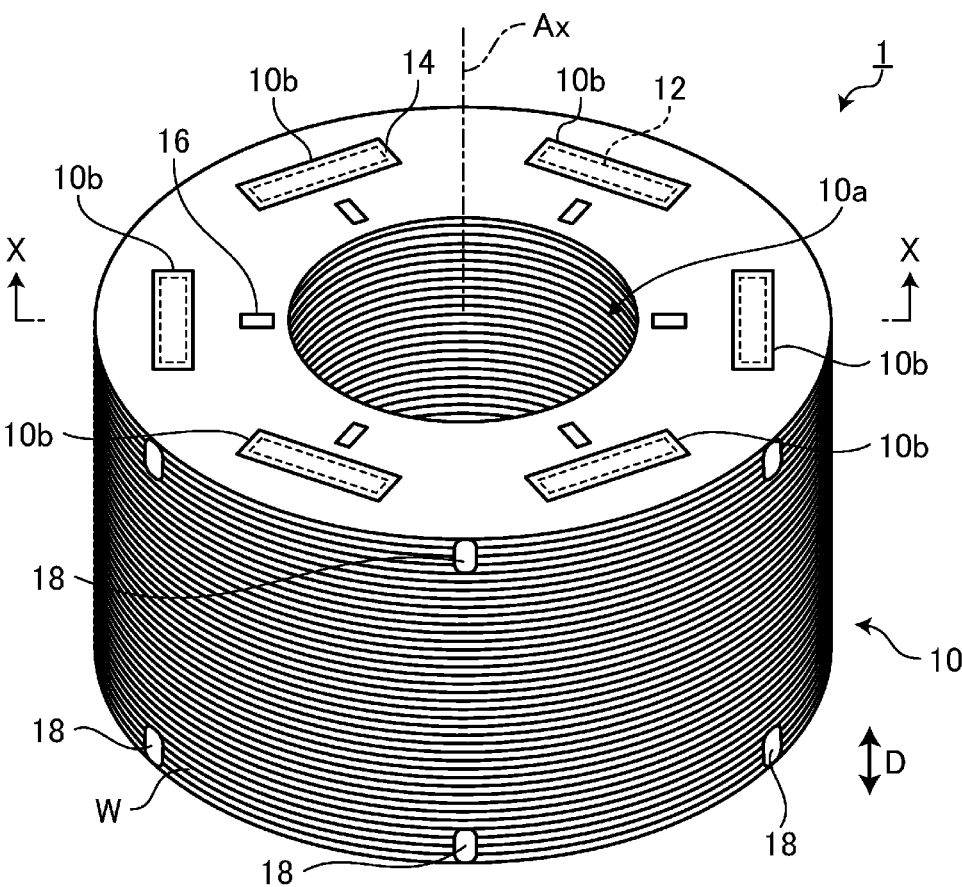
FIG. 1A is a schematic diagram showing an example of a laminated iron core according to an embodiment.
Figure 1B:
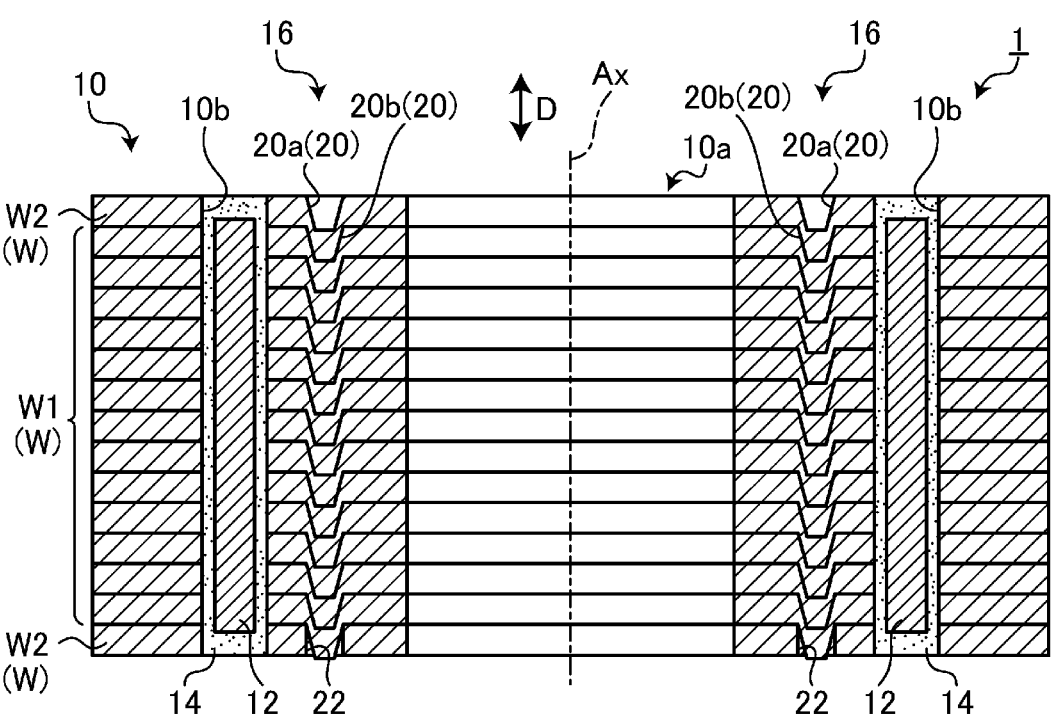
FIG. 1B is a cross-sectional view taken along line X-X shown in FIG. 1A.

First, a configuration of a laminated iron core 1 according to an embodiment will be described with reference to FIG. 1A and FIG. 1B. FIG. 1A is a schematic diagram showing an example of the laminated iron core 1 according to the embodiment, and FIG. 1B is a cross-sectional view taken along line X-X shown in FIG. 1A.

The laminated iron core 1 is, for example, a rotor laminated iron core, and is a part of a rotor. A motor is formed by combining the rotor with a stator. The laminated iron core 1 according to the embodiment is used in, for example, an interior permanent magnet (IPM) motor.

The laminated iron core 1 includes a laminated body 10, a plurality of magnets 12, a plurality of resins 14, a plurality of caulking portions 16, and a plurality of welded portions 18. The laminated body 10 has, for example, a cylindrical shape. A shaft hole 10a penetrating the laminated body 10 is provided in a central portion of the laminated body 10 so as to extend along a central axis Ax.

That is, the shaft hole 10a extends in a lamination direction D of the laminated body 10 (hereinafter, simply referred to as "lamination direction D"). The lamination direction D is also an extending direction of the central axis Ax. In the present disclosure, the laminated body 10 rotates around the central axis Ax, and the central axis Ax is also a rotation axis. A shaft (not shown) is inserted into the shaft hole 10*a*.

A plurality of through holes 10*b* are formed in the laminated body 10. As shown in FIG. 1A, the plurality of through holes 10*b* are arranged at substantially equal intervals along a circumferential direction of the laminated body 10. As shown in FIG. 1B, the through holes 10*b* penetrate the laminated body 10 so as to extend along the lamination direction D.

A shape of the through hole 10*b* is, for example, an elongated hole extending along an outer peripheral edge of the laminated body 10. The position, the shape, and the number of the through holes 10*b* may be appropriately changed according to application of the motor, the required performance, and the like.

The magnet 12 is a columnar permanent magnet, for example, a sintered magnet such as a neodymium magnet or a bonded magnet. The type of the magnet 12 is appropriately determined according to the application of the motor, the required performance, and the like. The plurality of magnets 12 are inserted into the plurality of through holes 10*b*, respectively. The shape of the magnet 12 is not particularly limited, and in the present disclosure, the magnet has a rectangular parallelepiped shape.

In the embodiment, the plurality of magnets 12 are provided in the laminated iron core 1 which is the rotor laminated iron core, so that a highly efficient motor can be achieved.

The resin 14 is obtained by filling the through hole 10*b* with a molten resin material (molten resin) after the magnet 12 is inserted, and solidifying the molten resin. The resin 14 has a function of fixing the magnet 12 in the through hole 10*b* and a function of joining the iron core pieces W adjacent to each other in the lamination direction D. That is, in the embodiment, by providing the plurality of resins 14 in the laminated iron core 1, the mechanical characteristics of the laminated iron core 1 can be improved.

Examples of the resin material for the resin 14 include a thermosetting resin and a thermoplastic resin. Specific examples of the thermosetting resin include, for example, a resin composition containing an epoxy resin, a curing initiator, and an additive. Examples of the additive include a filler, a flame retardant, and a stress reducer.

The laminated body 10 is formed by laminating a plurality of iron core pieces W. The iron core piece W is an example of a metal sheet. The iron core piece W is a plate-shaped body obtained by punching an electromagnetic steel sheet MS (see FIG. 2) into a predetermined shape, and has a shape corresponding to the laminated body 10.

In the present disclosure, as shown in FIG. 1B, the iron core piece W located at a position other than the endmost position in the lamination direction D of the laminated body 10 is referred to as "iron core piece W1", and the iron core piece W located at the endmost position in the lamination direction D of the laminated body 10 is referred to as "endmost iron core piece W2". The endmost iron core piece W2 is an example of an endmost metal sheet.

The laminated body 10 according to the embodiment may be configured by so-called rotational lamination. The term "rotational lamination" refers to laminating the plurality of iron core pieces W while shifting angles of the iron core pieces W relatively. The rotational lamination is performed mainly for the purpose of canceling out a plate thickness deviation of the laminated body 10. An angle of the rotational lamination may be set to any value.

The iron core pieces W adjacent to each other in the lamination direction D are fastened by the caulking portions 16 as shown in FIG. 1B. Specifically, the caulking portions 16 includes caulking 20 formed in the iron core pieces W1 and the upper endmost iron core piece W2, and a through hole 22 formed in the lower endmost iron core piece W2.

The caulking 20 includes a recess 20*a* formed on a front surface side of the iron core pieces W1 and the upper endmost iron core piece W2, and a protrusion 20*b* formed on a back surface side of the iron core pieces W1 and the upper endmost iron core piece W2. The caulking 20 has, for example, a mountain shape as a whole. The caulking 20 having such a shape is also referred to as "V-shaped caulking".

One recess 20*a* fits into the protrusion 20*b* adjacent to the recess 20*a*. The protrusion 20*b* of one iron core piece W1 is joined to the recess 20*a* of the adjacent iron core piece W1 on the back surface side of the one iron core piece W1.

The through hole 22 is a long hole having a shape corresponding to an outer shape of the caulking 20. When the caulking 20 is V-shaped caulking, the through hole 22 has a rectangular shape. The protrusion 20*b* of the iron core piece W1 adjacent to the lower endmost iron core piece W2 is fitted into the through hole 22.

The through hole 22 has a function of preventing the iron core piece W formed subsequently from being fastened by the caulking 20 (protrusion 20*b*) to the already manufactured laminated body 10 when the laminated body 10 is continuously manufactured.

FIG. 1B shows an example in which the caulking 20 is V-shaped caulking, but the present disclosure is not limited to such an example, and caulking of various shapes is applicable.

Further, in the laminated body 10 according to the embodiment, the iron core pieces W adjacent to each other may be fastened by various known methods instead of the caulking portions 16. For example, the iron core pieces W adjacent to each other may be joined to each other using an adhesive or a resin material, or may be joined to each other by welding.

Alternatively, the laminated body 10 may be obtained by providing temporary caulking to the iron core pieces W, fastening the plurality of iron core pieces W via the temporary caulking to obtain the laminated body, and then removing the temporary caulking from the laminated body. The "temporary caulking" means caulking that is used to temporarily integrate the plurality of iron core pieces W and is removed in the process of manufacturing a product (the laminated iron core 1 or the stator).

The welded portion 18 is a portion subjected to a welding process to be described later. As shown in FIG. 1A, the welded portions 18 are located at both ends in the lamination direction D of the laminated body 10 so as to be in contact with at least the endmost iron core piece W2 (see FIG. 1B).

Accordingly, it is possible to prevent the endmost iron core piece W2 from being separated from the laminated body 10 by a repulsive force based on a repulsive magnetic force generated between the iron core pieces W adjacent to each other when the magnetic flux from the magnet 12 passes through the iron core pieces W.

The plurality of welded portions 18 are arranged, for example, at substantially equal intervals in the circumferential direction. The detailed configuration of the welded portion 18 will be described later.

Manufacturing Device

Figure 2:
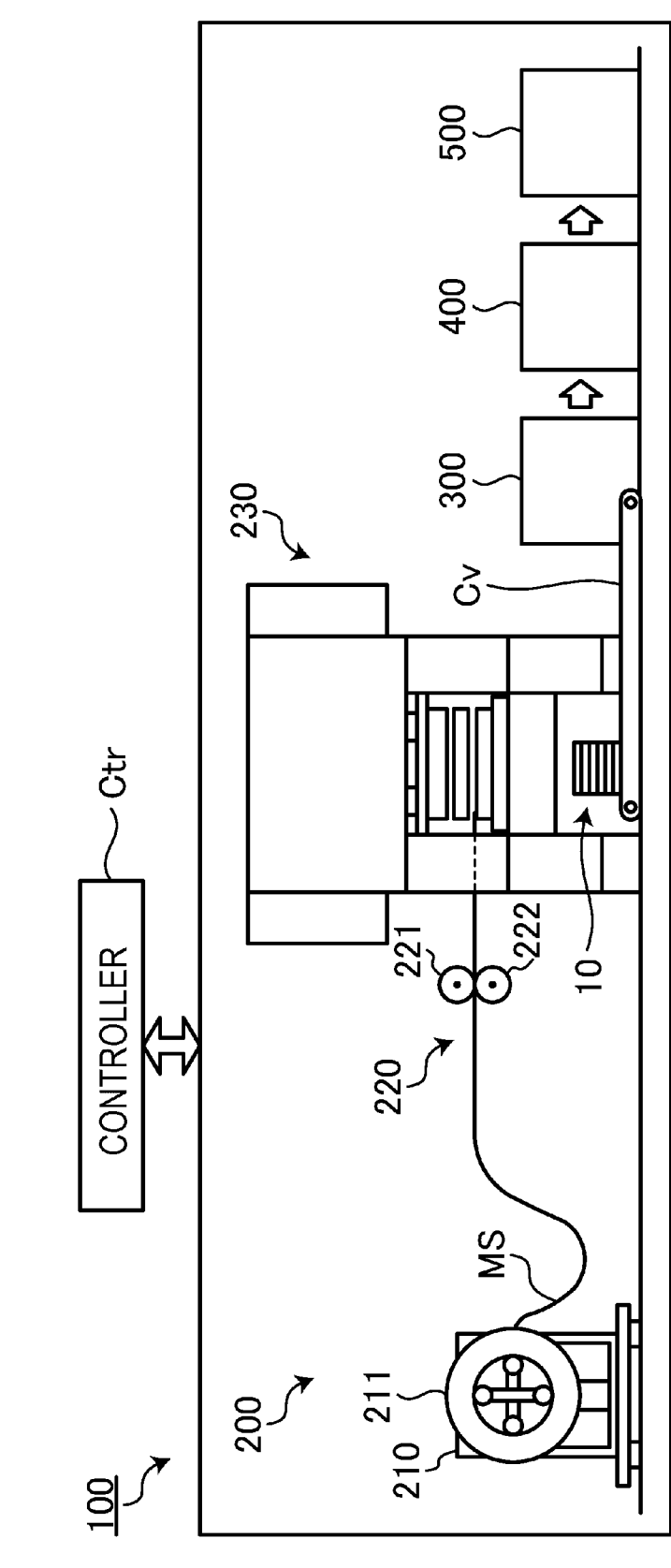
FIG. 2 is a schematic view showing an example of a manufacturing device for a laminated iron core according to the embodiment.

Next, a manufacturing device 100 of the laminated iron core 1 according to the embodiment will be described with reference to FIG. 2. FIG. 2 is a perspective view showing an example of the manufacturing device 100 of the laminated iron core 1 according to the embodiment. The manufacturing device 100 according to the embodiment is configured to manufacture the laminated body 10 of the iron core pieces W (see FIG. 1A) from a strip-shaped electromagnetic steel sheet MS and manufacture the laminated iron core 1 (see FIG. 1A) from the laminated body 10.

As shown in FIG. 2, the manufacturing device 100 includes a punching device 200, a magnet inserting device 300, a resin injecting device 400, a welding device 500, and a controller Ctr (control unit).

The punching device 200 includes an uncoiler 210, a feeding device 220, and a press processing device 230. The uncoiler 210 is configured to rotatably hold a coil material 211. The coil material 211 is obtained by winding the electromagnetic steel sheet MS in a coil shape (spiral shape).

The feeding device 220 includes a pair of rollers 221 and 222 sandwiching the electromagnetic steel sheet MS from above and below. The pair of rollers 221 and 222 are configured to rotate and stop based on an instruction signal from the controller Ctr, and intermittently and sequentially feed the electromagnetic steel sheet MS toward the press processing device 230. That is, the pair of rollers 221 and 222 function as a conveying unit for conveying the electromagnetic steel sheet MS.

The press processing device 230 is configured to operate based on an instruction signal from the controller Ctr. The press processing device 230 has, for example, a function of forming the iron core pieces W by sequentially punching the metal sheets MS intermittently fed out by the feeding device 220, and a function of manufacturing the laminated body 10 by sequentially laminating the iron core pieces W obtained by the punching.

In the laminated body 10, a plurality of iron core pieces W are stacked in a state of being fastened to each other by the caulking portions 16 or the like.

The magnet inserting device 300 operates based on an instruction from the controller Ctr, and has a function of inserting the magnet 12 (see FIG. 1A) into the through hole 10b (see FIG. 1A) of the laminated body 10 conveyed by a conveyor Cv or the like from the punching device 200.

The resin injecting device 400 operates based on an instruction from the controller Ctr, and has a function of injecting the resin 14 (see FIG. 1A) into the through hole 10b of the laminated body 10 conveyed from the magnet inserting device 300.

The welding device 500 operates based on an instruction from the controller Ctr, and has a function of welding the laminated body 10 conveyed from the resin injecting device 400. Details of the welding process in the welding device 500 will be described later.

The controller Ctr is configured to generate an instruction signal for operating each device in the manufacturing device 100 based on, for example, a program recorded in a recording medium (not shown) or an operation input from an operator. The controller Ctr is configured to transmit the instruction signal to each device in the manufacturing device 100.

Manufacturing Process

Figure 3:
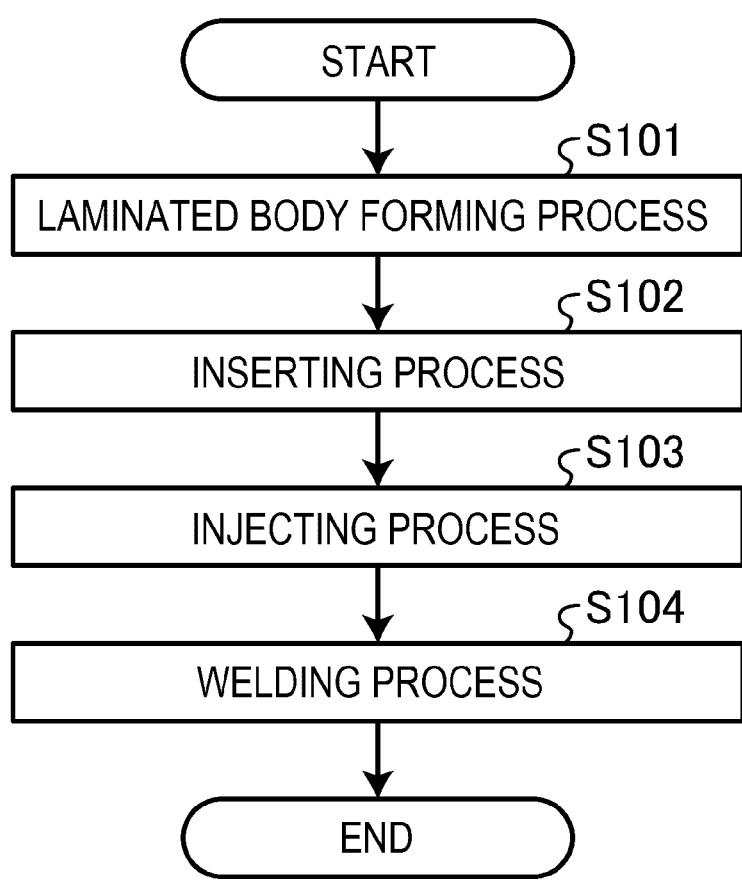
FIG. 3 is a flowchart showing an example of a procedure of each manufacturing process performed by the manufacturing device for a laminated iron core according to the embodiment.

Next, a manufacturing process of the laminated iron core 1 according to the embodiment will be described with reference to FIGS. 3 to 7C. FIG. 3 is a flowchart showing an example of a procedure of each manufacturing process performed by the manufacturing device 100 for the laminated iron core 1 according to the embodiment.

As shown in FIG. 3, the controller Ctr first controls the punching device 200 to perform punching processing on the electromagnetic steel sheet MS, and laminates the iron core pieces W formed by the punching processing to form the laminated body 10 (step S101).

Next, the controller Ctr controls the magnet inserting device 300 to insert the magnet 12 into the through hole 10b of the laminated body 10 (step S102). Then, the controller Ctr controls the resin injecting device 400 to inject the resin 14 into the through hole 10b of the laminated body 10 into which the magnet 12 is inserted (step S103).

Finally, the controller Ctr controls the welding device 500 to weld the endmost iron core piece W2 and the iron core piece W1 adjacent to the endmost iron core piece W2 (step S104). This completes a series of manufacturing processes.

Figure 4A:
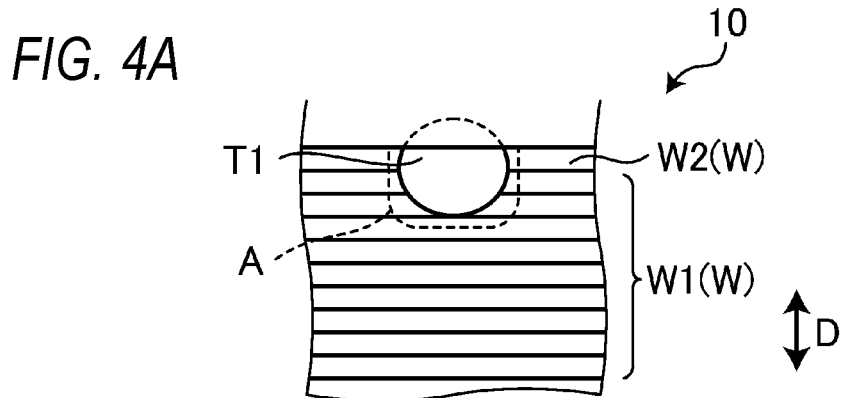
FIGS. 4A to 4C are diagrams illustrating an example of a welding process according to a reference example.
Figure 4B:
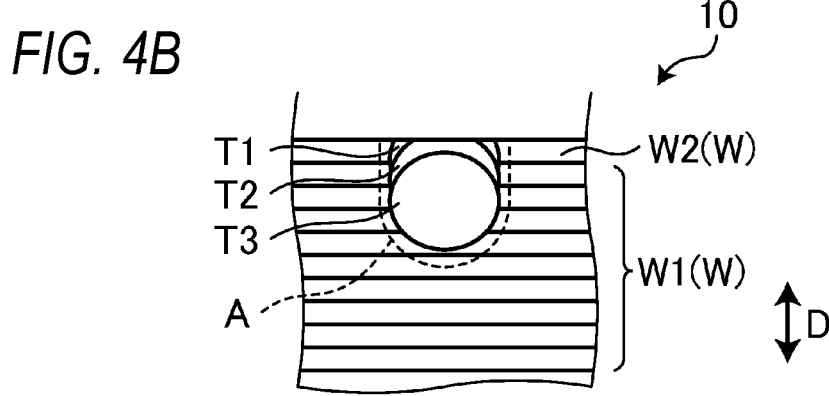
Figure 4C:
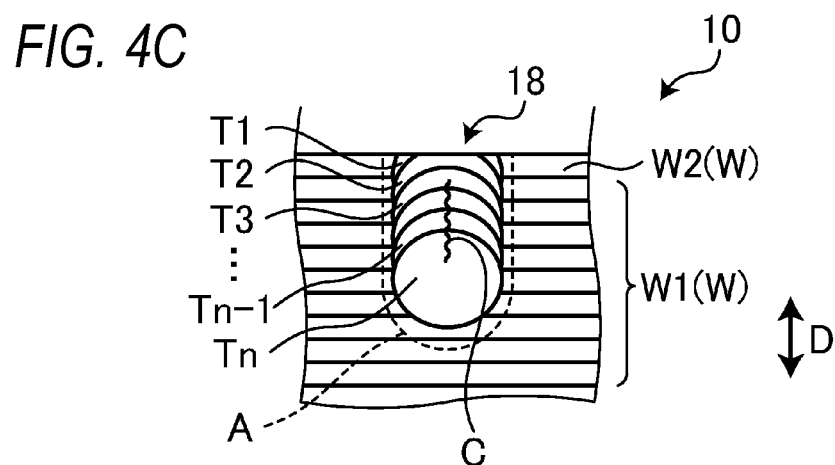

FIGS. 4A to 4C are diagrams illustrating an example of a welding process according to a reference example. In the welding process of the embodiment and the reference example, the controller Ctr (see FIG. 2) controls a welding torch (not shown) mounted on the welding device 500 (see FIG. 2) to irradiate a desired position on the laminated body 10 with laser.

Accordingly, the portion irradiated with the laser melts, and then cools and solidifies, thereby welding the portion irradiated with the laser.

In the reference example shown in FIGS. 4A to 4C, as shown in FIG. 4A, the controller Ctr first irradiates a position in contact with the endmost iron core piece W2 with laser. Thus, a semicircular welding mark T1 is formed in the laminated body 10 so as to be in contact with the endmost iron core piece W2.

A region A in which residual stress during welding is accumulated is formed around the welding mark T1. The residual stress in the region A is stress in a tensile direction generated when the welded portion contracts during cooling.

Next, as shown in FIG. 4B, the controller Ctr performs the second and third welding while gradually shifting a welding position in a direction away from the endmost iron core piece W2 with respect to a first welding position (corresponding to the welding mark T1). At this time, the next welding is performed while partially overlapping the previous welding position. Thus, a second welding mark T2 and a third welding mark T3 are formed.

The region A in which residual stress during first to third welding is accumulated is formed around the welding marks T1 to T3. In the region A, a larger amount of residual stress is accumulated around a position where the welding is performed last (the third welding mark T3 in FIG. 4B). This is because the welding is performed at a position partially overlapping the previous welding position, and therefore, the residual stress generated during the previous welding is carried over to the surroundings of the next welding position.

Further, as shown in FIG. 4C, the controller Ctr performs welding up to the n-th time (for example, n=about 10) while gradually shifting the welding position in the direction away from the endmost iron core piece W2 from the fourth time onwards, and partially overlapping the previous welding position. Accordingly, a welded portion 18 including a plurality of welding marks T1, T2, T3, . . . , Tn−1, Tn is formed, and the welding process of the reference example is completed.

The region A in which residual stress during all welding is accumulated is formed around the welding marks T1 to Tn. In the region A, more residual stress is accumulated around the position where the welding is performed last (that is, the last welding mark Tn). This is because, in the welding process of the reference example, the last welding mark Tn (hereinafter, also referred to as a "welding end Tn") is entirely surrounded by the iron core piece W1, and thus there is no place for the residual stress to be released around the welding end Tn.

In the reference example, when the welded portion 18 cannot withstand the residual stress in the tensile direction accumulated around the welding end Tn, a crack C occurs in the welded portion 18. Accordingly, in the reference example, the quality of the welded portion 18 may be degraded.

Figure 5A:
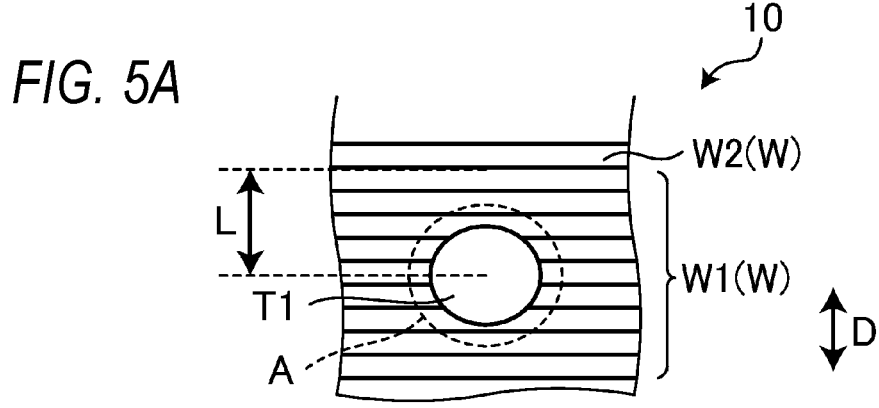
FIGS. 5A to 5C are diagrams illustrating an example of a welding process according to the embodiment.
Figure 5B:
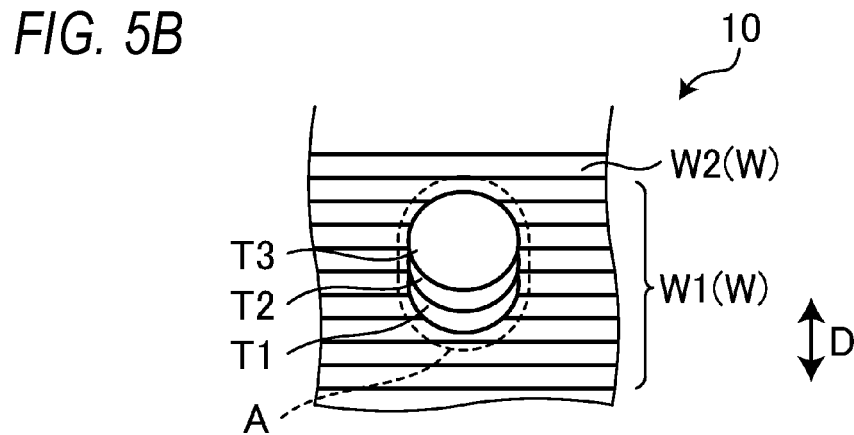
Figure 5C:
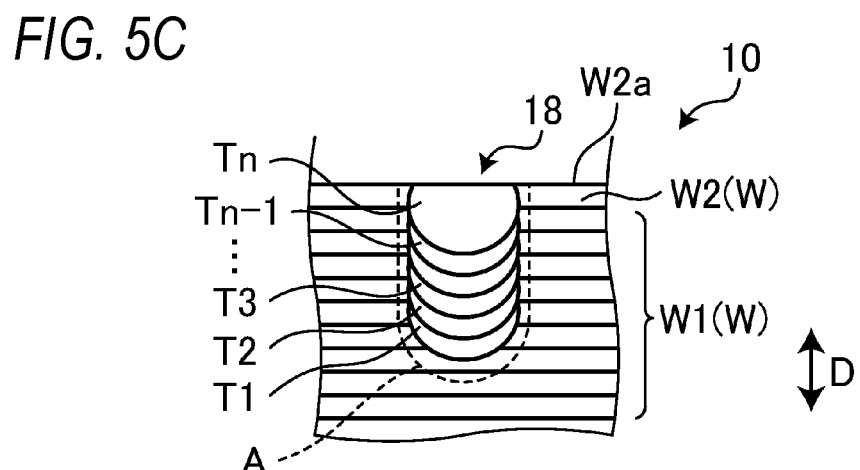

Therefore, in the embodiment, the crack C is prevented from generating by performing the welding process according to the procedure described below. FIGS. 5A to 5C are diagrams illustrating an example of the welding process according to the embodiment.

As shown in FIG. 5A, in the embodiment, the controller Ctr (see FIG. 2) first irradiates with laser a position separated from the endmost iron core piece W2 by a predetermined distance L. The predetermined distance L is, for example, 1 (mm) to 3 (mm).

Thus, an elliptical or circular welding mark T1 is formed at a position not in contact with the endmost iron core piece W2 in the laminated body 10. As in the above-described reference example, a region A in which residual stress during welding is accumulated is formed around the welding mark T1.

Next, as shown in FIG. 5B, the controller Ctr performs the second and third welding while gradually shifting a welding position in a direction approaching the endmost iron core piece W2 with respect to a first welding position (corresponding to the welding mark T1). At this time, the next welding is performed while partially overlapping the previous welding position. Thus, a second welding mark T2 and a third welding mark T3 are formed.

The region A in which residual stress during first to third welding is accumulated is formed around the welding marks T1 to T3. As in the reference example described above, in the region A, a larger amount of residual stress is accumulated around a position where the welding is performed last (the third welding mark T3 in FIG. 5B).

Further, as shown in FIG. 5C, the controller Ctr performs welding up to the n-th time (for example, n=about 10) while gradually shifting the welding position in the direction approaching the endmost iron core piece W2 from the fourth time onwards, and partially overlapping the previous welding position. Accordingly, the welded portion 18 including a plurality of welding marks T1, T2, T3, . . . , Tn−1, Tn is formed, and the welding process according to the embodiment is completed.

In the embodiment, as shown in FIG. 5C, the last (n-th) welding mark Tn (that is, the welding end Tn) is in contact with the endmost iron core piece W2.

Accordingly, the residual stress accumulated around the welding end Tn when the welding end Tn is formed is relaxed. This is because the welding end Tn is in contact with an exposed surface W2a of the endmost iron core piece W2, and thus the exposed surface W2a serves as a place for residual stress to be released.

That is, in the embodiment, the welding is performed such that the welding end Tn is in contact with the endmost iron core piece W2, so that even when the welding is performed a plurality of times while the welding portions are partially overlapped, the occurrence of the crack C (refer to FIG. 4C) can be prevented in the welded portion 18. Therefore, according to the embodiment, the welding quality of the laminated iron core 1 (see FIG. 1A) can be improved.

In the welding process according to the embodiment, a position away from the endmost iron core piece W2 may be first welded, the next welding may be performed while partially overlapping the previous welding position, and a position in contact with the endmost iron core piece W2 may be finally welded.

Accordingly, even in a portion deeper than a surface of the welded portion 18 (that is, a side surface of the laminated body 10), the melted and solidified portion can be joined together along the lamination direction D, so that the welding strength of the welded portion 18 can be increased.

In addition, in the welding process according to the embodiment, the welding may be performed a plurality of times such that the welding is performed first at a position farthest from the endmost iron core piece W2 in the welded portion 18 and at positions gradually approaching the position in contact with the endmost iron core piece W2. That is, in the embodiment, as shown in FIG. 5C, the welded portion 18 may be configured to include a plurality of crescent-shaped welding marks T1 to Tn−1 protruding in the direction away from the endmost iron core piece W2.

Accordingly, since a moving distance of the welding torch in the welding process can be shortened, the welding process can be completed in a shorter time.

In the example shown in FIGS. 5A to 5C, the welding process according to the embodiment is illustrated as an example in which the welding is performed a plurality of times such that the welding is performed first at a position farthest from the endmost iron core piece W2 in the welded portion 18 and at positions gradually approaching the position in contact with the endmost iron core piece W2, but the present disclosure is not limited to such an example.

Figure 6A:
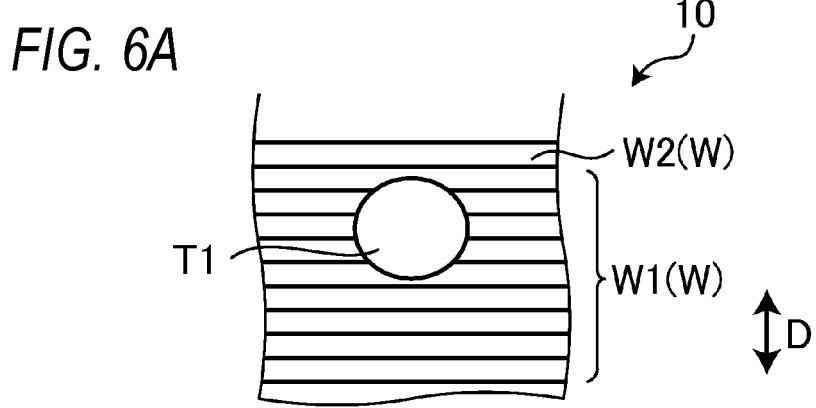
FIGS. 6A to 6C are diagrams illustrating an example of a welding process according to a first modification of the embodiment.
Figure 6B:
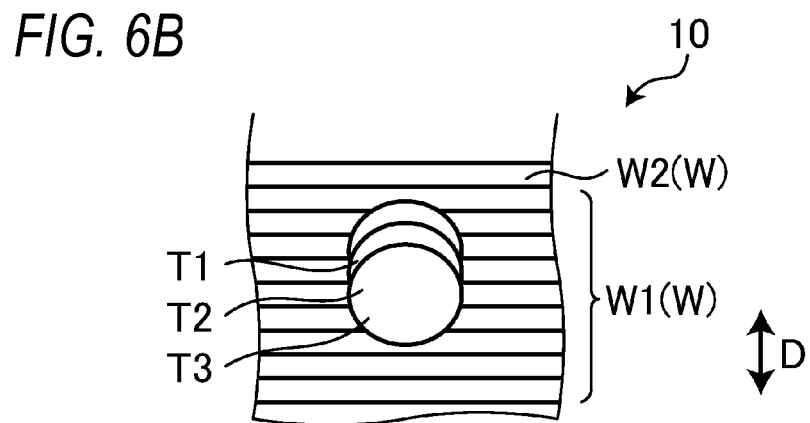
Figure 6C:
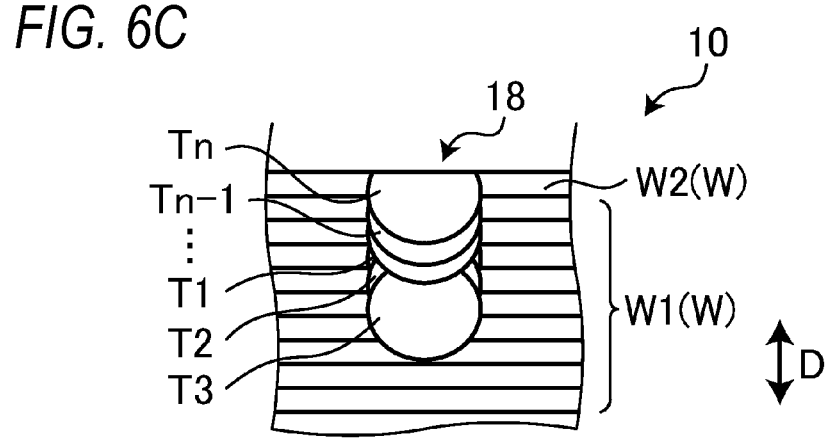

For example, as shown in FIGS. 6A to 6C, welding is started from a position between a position in contact with the endmost iron core piece W2 and a position farthest from the endmost iron core piece W2 in the welded portion 18 (FIG. 6A), and the welding position is gradually shifted in a direction away from the endmost iron core piece W2 (FIG. 6B).

Then, after the welding is completed at the position farthest from the endmost iron core piece W2 at the welded portion 18, the welding may be performed a plurality of times while gradually approaching the position in contact with the endmost iron core piece W2 from the position at which the welding is performed first (FIG. 6C). FIGS. 6A to 6C are diagrams illustrating an example of the welding process according to a first modification of the embodiment.

Accordingly, the welding end Tn is also in contact with the endmost iron core piece W2, so that the residual stress accumulated around the welding end Tn at the time of forming the welding end Tn is relaxed. Therefore, the welding quality of the laminated iron core 1 (see FIG. 1A) can be improved.

In the welding process according to the embodiment, the welding may be performed a plurality of times such that the welding marks T1 to Tn are arranged in a row. Accordingly, since a moving distance of the welding torch in the welding process can be shortened, the welding process can be completed in a shorter time.

Figure 7A:
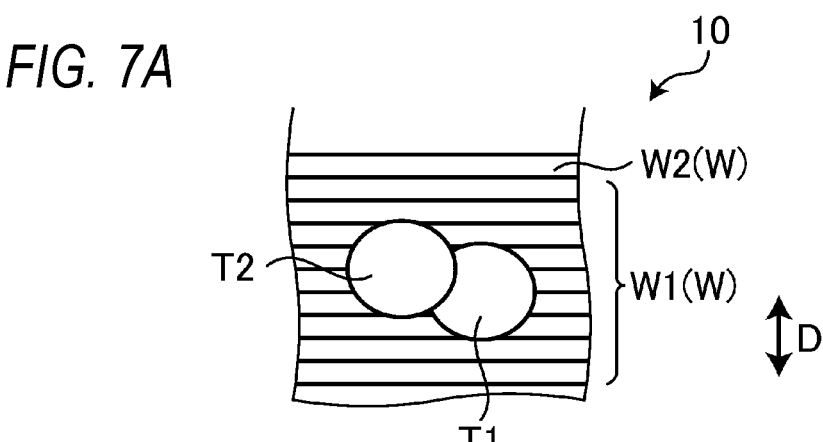
FIGS. 7A to 7C are diagrams illustrating an example of a welding process according to a second modification of the embodiment.
Figure 7B:
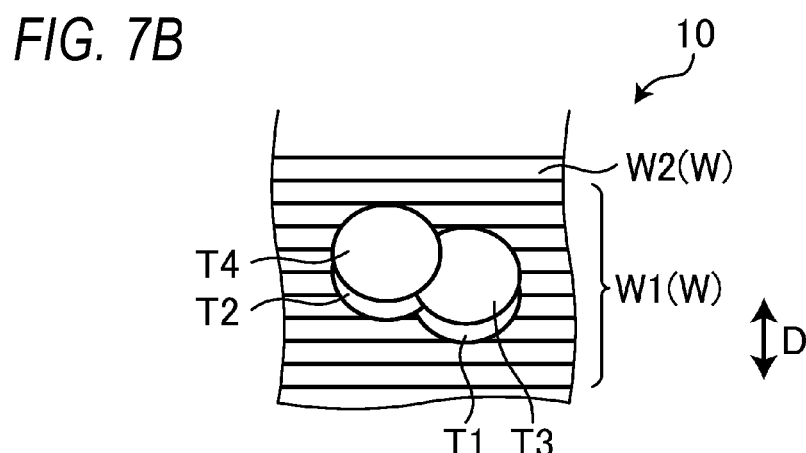
Figure 7C:
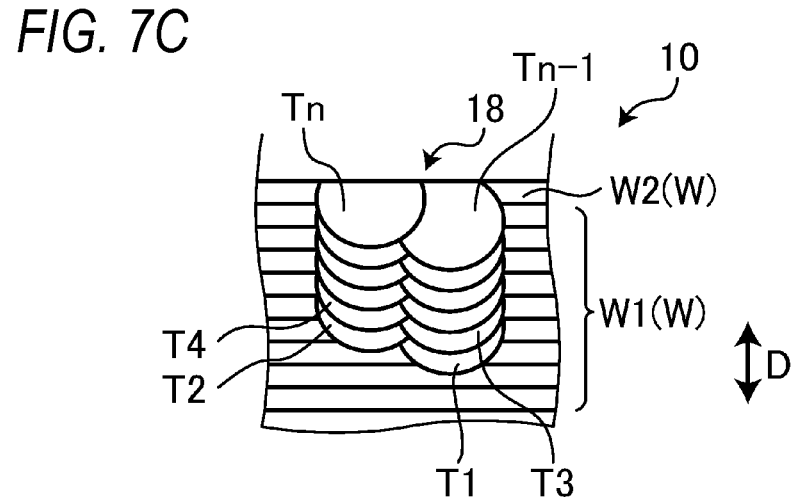

In the examples of FIGS. 5A to 6C, an example in which the welding marks T1 to Tn are arranged in a row in the welded portion 18 is illustrated, but the present disclosure is not limited to such an example. FIGS. 7A to 7C are diagrams illustrating an example of a welding process according to a second modification of the embodiment.

As shown in FIGS. 7A to 7C, in the present disclosure, the welding marks T1 to Tn may be arranged in a plurality of rows (two rows in FIGS. 7A to 7C) in the welded portion 18. In this case, as shown in FIGS. 7A to 7C, welding may be performed alternately on one row and on the other row, and welding may be performed a plurality of times while gradually approaching the position in contact with the endmost iron core piece W2 from the position away from the endmost iron core piece W2.

Accordingly, the welding end Tn is also in contact with the endmost iron core piece W2, so that the residual stress accumulated around the welding end Tn at the time of forming the welding end Tn is relaxed. Therefore, the welding quality of the laminated iron core 1 (see FIG. 1A) can be improved.

Further, by performing the welding a plurality of times along a plurality of rows, a width of the welded portion 18 can be increased, so that the welding strength of the welded portion 18 can be further increased.

In the example of FIGS. 7A to 7C, an example in which the welding marks T1 to Tn are arranged in two rows in the welded portion 18 is illustrated, but the present disclosure is not limited to the example, and the welding marks T1 to Tn may be arranged in three or more rows in the welded portion 18.

In the embodiment, the welded portion 18 may be formed such that the welding end Tn is in contact with the endmost iron core piece W2 with respect to the laminated body 10 in which the adjacent iron core pieces W are joined to each other by providing the resin 14.

If the welding process according to the reference example shown in FIGS. 4A to 4C is performed on the laminated body 10 in which the adjacent iron core pieces W are joined to each other with the resin 14, since there is less room for the residual stress to be released than the laminated body 10 in which the iron core pieces W are not joined to each other with the resin 14, the crack C is more likely to occur at the time of welding.

Therefore, in the embodiment, the welded portion 18 is formed such that the welding end Tn is in contact with the endmost iron core piece W2 with respect to the laminated body 10 in which the adjacent iron core pieces W are joined to each other with the resin 14, so that even in the laminated body 10 where a crack C is likely to occur during welding, the crack C can be prevented from occurring.

In the embodiments described above, the endmost iron core piece W2 with which the welding end Tn of the welded portion 18 comes into contact may be any one of the upper endmost iron core piece W2 and the lower endmost iron core piece W2, or may be both the upper endmost iron core piece W2 and the lower endmost iron core piece W2. That is, the welding end Tn of the welded portion 18 may be in contact with at least one endmost iron core piece W2.

In this case, since it is possible to prevent the occurrence of the crack C in the welded portion 18 in which the welding end Tn is in contact with the endmost iron core piece W2, the welding quality of the laminated iron core 1 can be improved.

In addition, in the embodiment described above, an example in which the endmost metal sheet of the laminated body 10 is the iron core piece W formed of the electromagnetic steel sheet MS has been described, but the present disclosure is not limited thereto.

For example, for the purpose of preventing the magnet 12 from separating from the through hole 10b, the technique of the present disclosure may be applied to the welded portion 18 where the endmost metal sheet is welded when the metal sheet that closes the entrance and exit of the through hole 10b is positioned at the endmost position of the laminated body 10. In this case, the endmost metal sheet is not limited to being made of the electromagnetic steel sheet MS, and may be made of, for example, stainless steel.

In this case, the welding end Tn is also in contact with the endmost metal sheet, so that the residual stress accumulated around the welding end Tn at the time of forming the welding end Tn is relaxed. Therefore, the welding quality of the laminated iron core 1 (see FIG. 1A) can be improved.

The embodiment of the present invention has been described above, but the present invention is not limited to the above embodiment, and various modifications can be made without departing from the scope of the present invention. For example, in the above embodiment, the welding process when welding the endmost iron core piece W2 of the laminated iron core 1 constituting the rotor is described, but the present disclosure is not limited to such an example, and the technique of the present disclosure may be applied when welding the endmost iron core piece of the laminated iron core constituting a stator.

In addition, in the above embodiment, the welding process for the laminated iron core 1 in which the magnet 12 is inserted into the laminated body 10 formed with the through hole 10b is described, but the present disclosure is not limited to such an example. For example, the technique of the present disclosure may be applied to a welding process for the laminated iron core 1 that does not have the through hole 10b or in which the magnet 12 is not inserted into the through hole 10b.

That is, the technique of the present disclosure may be applied to a case where the inserting process (step S102) and the injecting process (step S103) are not included in the manufacturing process of the laminated iron core shown in FIG. 3.

Further, effects and modifications can be easily derived by those skilled in the art. Therefore, broader aspects of the invention are not limited to the specific details and representative embodiments shown and described above. Therefore, various changes may be made without departing from the spirit or scope of the general inventive concept defined by the appended claims and equivalents thereof.

The invention claimed is:

1. A laminated iron core comprising:
   a laminated body including a plurality of laminated metal sheets,
   wherein the laminated body includes:
   a first welded portion where a first endmost metal sheet located at a first endmost position in a lamination direction and the metal sheet in contact with the first endmost metal sheet are welded, and
   a second welded portion where a second endmost metal sheet located at a second endmost position in the lamination direction opposite the first endmost position and the metal sheet in contact with the second endmost metal sheet are welded, and
   wherein a first welding end of the first welded portion is in contact with the first endmost metal sheet, and a second welding end of the second welded portion is in contact with the second endmost metal sheet.

2. The laminated iron core according to claim 1,
   wherein the first welded portion has a plurality of crescent-shaped welding marks, and
   wherein the plurality of welding marks protrude in a direction away from the first endmost metal sheet.

3. The laminated iron core according to claim 2, wherein the plurality of welding marks are arranged in a row.

4. The laminated iron core according to claim 2, wherein the plurality of welding marks are arranged in a plurality of rows.

5. The laminated iron core according to claim 1, wherein the laminated body has a through hole penetrating along the lamination direction, and wherein a magnet extending along the lamination direction is sealed with a resin inside the through hole.

6. A laminated iron core manufacturing method comprising:

a laminated body forming process of forming a laminated body by laminating a plurality of metal sheets; and a welding process of welding a first endmost metal sheet located at a first endmost position in a lamination direction of the laminated body and the metal sheet in contact with the first endmost metal sheet and welding a second endmost metal sheet located at a second endmost position in the lamination direction opposite the first endmost position and the metal sheet in contact with the second endmost metal sheet, wherein in the welding process, a position in contact with each of the first and the second endmost metal sheets is welded last.

7. The laminated iron core manufacturing method according to claim 6, wherein in the welding process, welding is first performed at a position away from the first endmost metal sheet, and welding is performed a plurality of times at positions gradually approaching a position in contact with the first endmost metal sheet.

8. The laminated iron core manufacturing method according to claim 7, wherein in the welding process, welding is performed a plurality of times such that welding marks are arranged in a row.

9. The laminated iron core manufacturing method according to claim 7, wherein in the welding process, welding is performed a plurality of times such that welding marks are arranged in a plurality of rows.

10. The laminated iron core manufacturing method according to claim 6, further comprising:

a process of inserting a magnet into a through hole penetrating the laminated body along the lamination direction; and a process of sealing the magnet with a resin.

* * * * *